United States Patent [19]

Kunz et al.

[11] Patent Number: 5,042,991
[45] Date of Patent: Aug. 27, 1991

[54] HYDROPHOBICALLY COATED ABRASIVE GRAIN

[75] Inventors: Reiner Kunz; Rudolf Strittmatter, both of Waldshut-Tiengen, Fed. Rep. of Germany

[73] Assignee: Lonza Ltd., Gampel, Switzerland

[21] Appl. No.: 491,815

[22] Filed: Mar. 12, 1990

[30] Foreign Application Priority Data

Mar. 13, 1989 [CH] Switzerland ............................ 927/89

[51] Int. Cl.$^5$ ................................................. B24B 1/00
[52] U.S. Cl. ........................................ 51/295; 51/293; 51/307; 51/308; 51/309
[58] Field of Search ................. 51/293, 295, 307, 308, 51/309

[56] References Cited

U.S. PATENT DOCUMENTS

| | | |
|---|---|---|
| 1,910,444 | 5/1933 | Nicholson . |
| 2,527,044 | 10/1950 | Walton et al. ........................ 51/308 |
| 3,520,667 | 7/1970 | Taylor .................................... 51/295 |
| 3,528,790 | 9/1970 | Shrewsbury et al. ................ 51/298 |
| 4,110,083 | 8/1978 | Benedict ............................... 51/295 |
| 4,111,668 | 9/1978 | Walker et al. ........................ 51/309 |
| 4,151,686 | 5/1979 | Lee et al. .............................. 51/295 |
| 4,157,898 | 6/1979 | Walker et al. ........................ 51/309 |
| 4,162,899 | 7/1979 | Molnar et al. ........................ 51/295 |
| 4,184,853 | 1/1980 | Otopkov et al. ..................... 51/295 |
| 4,203,733 | 5/1980 | Tanaka et al. ........................ 51/295 |
| 4,249,913 | 2/1981 | Johnson et al. ...................... 51/295 |
| 4,426,209 | 1/1984 | Sarin et al. ........................... 51/295 |
| 4,505,720 | 3/1985 | Gabor et al. ......................... 51/309 |
| 4,514,192 | 4/1985 | Verma et al. ........................ 51/295 |
| 4,575,384 | 3/1986 | Licht et al. ........................... 51/308 |

OTHER PUBLICATIONS

Kirk-Othmer, "Encyclopaedia of Chemical Technology": (a) vol. 250, pp. 250, 251, and 255 to 258 and (b) vol. 20, pp. 38-47.

Primary Examiner—William R. Dixon, Jr.
Assistant Examiner—Willie J. Thompson
Attorney, Agent, or Firm—Fisher, Christen & Sabol

[57] ABSTRACT

The strength and water resistance of the binding of abrasive grain on the basis of corundum or silicon carbide into synthetic resin bonded abrasive agents is improved by a surface treatment with microdispersed hydrophobic silicon dioxide.

10 Claims, No Drawings

HYDROPHOBICALLY COATED ABRASIVE GRAIN

BACKGROUND OF THE INVENTION

1. Field Of The Invention

The invention relates to a hydrophobically coated abrasive grain based on corundum or silicon carbide, to its use in synthetic resin bonded abrasives, and to a process for producing it.

2. Background Art

The performance efficiency of elastically or rigidly bonded abrasives is determined not only by the hardness and toughness of the abrasive grain, but to a considerable extent also by the strength of the bonding. In synthetic resin bonded abrasives the essential water resistance of the bonding represents a considerable technical problem for wet grinding. The most frequently used abrasive grains based on corundum or silicon carbide have good water wettability without special preliminary treatment, which makes it possible for water to penetrate between the grain and the bonding agent and which entails a weakening of the bonding after storage or use under water.

Therefore, quite a few attempts have been made to make abrasive grain hydrophobic, i.e., water repellant, to prevent or at least reduce such decline in the strength of the bonding under the effect of water. There has been a partial success through treatment with silanes, such as, (3-aminopropyl)triethoxy-silane, as described in manufacturer's publication SF-1159 of Union Carbide Corporation (Silicons Division). However, it has been shown that the improvement in the characteristics of the abrasive grain that can thus be achieved is not lasting, but rather disappears again after a few months of storage. The abrasive grain treated in this manner, therefore, had to be further processed as quickly as possible, which had the result that the treatment was suitably undertaken only at the place of manufacture of the abrasives, and not in large lots at the place of manufacture of the abrasive grain, which in itself would be more economical. Further, the process itself is not as free of problems as it first seems. Fine grain sizes (e.g., F120 to F1200) tend toward agglomerate formation. The conditions for the necessary drying with the silane solution after the wetting of the abrasive grain must be maintained exactly to prevent hydrolysis or thermal decomposition, and finally silane is by no means toxicologically harmless, which leads to environmental and safety problems at the places of manufacture of the abrasives which are often not equipped to handle dangerous materials.

BROAD DESCRIPTION OF THE INVENTION

An object of the invention is to provide an abrasive grain which has been made durably hydrophobic and which has good bonding in synthetic resin masses which is not significantly diminished even under the effect of water. Another object of the invention is to provide a process for producing such abrasive grain in a simple and economical way without endangering personnel and the environment.

The invention objects are attained by the abrasive grain and the processes of the invention.

The invention involves abrasive grain composed of corundum or silicon carbide, which contains an unbonded, unfused coating of 0.001 to 5.0 percent, relative to the weight of the abrasive grain, of microdispersed hydrophobic silicon dioxide.

The invention also involves a process for producing the invention abrasive grain wherein untreated abrasive grain, based on corundum or silicon carbide, is coated by mixing it in a dry condition with the microdispersed hydrophobic silicon dioxide. The invention also involves a process for producing the invention abrasive grain wherein untreated abrasive grain composed of corundum or silicon carbide is coated by mixing or spraying with a suspension of the microdispersed silicon dioxide in a vaporizable liquid and subsequent drying.

It has been found that abrasive grain based on corundum, by which all kinds of aluminum oxide abrasives are meant, such as, normal corundum also known as regular aluminum oxide, blue corundum, semifriable fused alumina and white fused alumina, and zirconia/alumina as well as sintered alumina, just as abrasive grain based on silicon carbide or grain mixtures, by coating with microdispersed hydrophobic silicon dioxide without the use of a bonding agent and without high temperature treatment, can be made durably hydrophobic. The reduction or even the elimination of wettability by water, as is measured with the determination of the rise in height according to FEPA, was to be expected on the basis of the known properties of the microdispersed hydrophobic silicon dioxide. However, what is completely surprising is that the silicon dioxide adhering only superficially does not simply fall away under mechanical stress and thus reduce the strength of test pieces or abrasive wheels but rather, to the contrary, it even increases the strength.

The amount of microdispersed hydrophobic silicon dioxide deposited suitably is 0.001 to 5.0 percent and preferably 0.1 to 1.0 percent, each range being relative to the weight of the abrasive grain. The optimum amount depends on the size of the grain and, thus, the specific surface of the abrasive grain; however, the advantageous effect hardly changes, even when the optimum amount is exceeded, over a relatively large range, thus no exact dosing is necessary.

The microdispersed hydrophobic silicon dioxide preferably has a particle size of the primary particles (indicated as $d_{50}$ value) of 5 to 100 nm and a specific surface (according to BET) of 80 to 300 $m^2/g$. Particularly preferred are products with a primary particle size of 7 to 20 nm and a specific surface of 100 to 150 $m^2/g$. Such a product is sold, for example, by the Degussa company under the name Aerosil ® R 972 or Aerosil ® R812 or by the Cabot company under the name Cab-o-sil TS 720 ®.

A further improvement in the properties of the abrasive grain according to the invention is attained by additional treatment with a silane of the general formula $H_2N-(CH_2)_n-Si(OR)_3$, wherein n is a whole number from 2 to 4 and R is an alkyl group having 1 to 4 carbon atoms. Such treatment is suitably performed, in a manner known in the art, on the abrasive grain already coated according to the invention. For such subsequent treatment, however, the limitations initially described hold true as to the durability of the additional improvement attained and the disadvantages in carrying out the process.

The production of the abrasive grain coated according to the invention advantageously is done by simply mixing commercially-available, untreated, abrasive grain of the desired grain size with the corresponding amount of the microdispersed hydrophobic silicon dioxide. The mixing procedure can be done using a commercially-available mixer (e.g., asymmetric moved mixer, rotary mixer or gravity mixer) and without other additives.

The microdispersed hydrophobic silicon dioxide can be suspended in a suitable nonaqueous liquid and applied to the abrasive grain by mixing the untreated abrasive grain with the suspension or by spraying the untreated abrasive grain with the suspension and subsequent evaporation of the liquid. For suspension of the microdispersed hydrophobic silicon dioxide, for example, liquid hydrocarbons, such as naphtha or heavy gasoline and mixtures thereof are suitable, but also ketones, such as acetone, alcohols, such as, isopropanol and esters, such as, ethyl acetate, are also suitable.

The abrasive grain according to the invention is preferably suitable for use in synthetic resin bonded abrasives, such as grinding wheels and abrasive cutting wheels or roughing wheels, and indeed particularly for those which are used for wet grinding. However, the scope of the invention also includes the production of abrasive agents which are supported, such as, grinding belts, for the abrasive grain of the invention.

DETAILED DESCRIPTION OF THE INVENTION

The following examples illustrate the invention and the properties of the abrasive grain of the invention.

EXAMPLE 1

Production of the coated abrasive grain by dry mixing

In an asymmetric moved mixer, 100 kg of untreated abrasive grain was mixed with 0.5 kg (0.5 percent by weight) of microdispersed hydrophobic silicic acid (Degussa Aerosil ® R 972) for 30 minutes. The following grain sizes were coated:
regular aluminum oxide Dural ® Dural ® F30 and P120
blue corundum Dural ® HT F24
semifriable fused alumina Abramant ® F36
white fused alumina Abramax ® F46 and F54
silicon carbide Carbogran ® dark F36, F80 and F180

EXAMPLE 2

Silanization according to prior art

In an asymmetric moved mixer, 100 kg of untreated abrasive grain was mixed for 20 minutes with a 1 percent aqueous silane solution (silane: A1100 of Union Carbide Corporation) and was subsequently dried at 110° to 120° C. The amount of the silane solution depended on the size of the grain, thus, for Example 1, 1 l was needed for grain 24 and 3.6 l was needed for grain 54.

EXAMPLE 3

Wettability tests

With the abrasive grain sizes treated according to Example 1, capillarity determinations according to the FEPA standard 44-D-1386 were performed. As a comparison, the same test was performed with the corresponding untreated abrasive grain sizes as well as with two silanized according to Example 2. The measured rises in height are listed in Table 1.

TABLE 1

| | | Rise in heights in mm according to FEPA 44-D1986 | | |
|---|---|---|---|---|
| Type of Grain | Grain Size | Untreated | According to the invention, Example 1 | Silanized Example 2 |
| Regular aluminum oxide | F 30 | 66 ± 3 | 0 | 45 ± 2 |
| | P 120 | 190 ± 5 | 0 | 165 ± 4 |
| Blue corundum | F 24 | 34 ± 2 | 0 | — |
| Semifriable fused alumina | F 36 | 26 ± 3 | 0 | — |
| White fused alumina | F 46 | 65 ± 3 | 0 | — |
| Silicon carbide | F 36 | 46 ± 3 | 0 | — |
| | F 80 | 147 ± 4 | 0 | — |
| | F 180 | 190 ± 5 | 0 | — |

EXAMPLE 4

Bending strength

Test rods having the dimensions of 120 mm×60 mm×15 mm were produced with untreated abrasive grain sizes F 54 of white fused alumina F 54 (Abramax ®), treated according to Example 1, silanized according to Example 2 as well as treated first according to Example 1 and then in addition according to Example 2 from two different production lots. To each of the test rods 15.8 kg of abrasive grain and 4.2 kg of phenolic resin mixture (30 percent of liquid and 70 percent of solid resin) were mixed to a homogenous mass, pressed in a press mold at 210 bars into rods of the desired size and cured at 180° C. for 7 hours. The density of the finished rods was 2.7 g/cm$^3$. On each of ten test rods, the bending strength in the dry state as well as after 5 days storage in a saturated soda solution of 40° C. was determined. The values found are reported in Table 2:

TABLE 2

| | Bending strengths (in N/cm$^2$ of the corundum grain sizes according to Example 4 (mean values and ranges of dispersion) | | | |
|---|---|---|---|---|
| Grain/Conditions | Untreated | According to the invention, Example 1 | Silanized Example 2 | According to the invention and silanized |
| Lot 1 | | | | |
| Dry | 3510 ± 130 | 4350 ± 150 | 3550 ± 100 | 4370 ± 120 |
| Wet | 2340 ± 100 | 2980 ± 250 | 2315 ± 150 | 3240 ± 140 |

TABLE 2-continued

| | Bending strengths (in N/cm² of the corundum grain sizes according to Example 4 (mean values and ranges of dispersion) | | | |
|---|---|---|---|---|
| Grain/Conditions | Untreated | According to the invention, Example 1 | Silanized Example 2 | According to the invention and silanized |
| Lot 2 | | | | |
| Dry | 3890 ± 260 | 4800 ± 190 | 4010 ± 130 | 4480 ± 190 |
| Wet | 1970 ± 150 | 2330 ± 330 | 2160 ± 170 | 3350 ± 230 |

EXAMPLE 5

Abrasive performance in surface grinding

From the same abrasive grain sizes as in Example 4, synthetic resin bonded grinding discs of the dimension 400 mm ×40 mm×40 mm (mold 1) were produced as follows:

75 percent by weight of abrasive grain, 17 percent by weight of phenolic resin mixture (liquid and solid) and 8 percent by weight of filling materials were worked into a homogeneous free flowing mass and then pressed into discs at 210 bars. The discs were heated for curing in a furnace over 10 hours to 180° C., left for 8 hours at this temperature and then cooled over 6 hours to room temperature. The density of the discs was 2.55 g/cm³.

A part of the discs was stored in saturated soda solution at 40° C. for 7 days.

The abrasive performance was determined with surface grinding on nickel chromium steel (18/8) and indicated in the usual manner as grinding ratio G:

$$G = \frac{\text{volume of metal removed (cm}^3)}{\text{volume of wheel used (cm}^3)}.$$

The abrasive performances determined thusly are set out in Table 3:

TABLE 3

| | Grinding ratios of the grinding discs according to Example 5 | | | |
|---|---|---|---|---|
| Grain/Conditions | Untreated | According to the invention, Example 1 | Silanized Example 2 | According to the invention and silanized |
| Without aging | 7.4 | 8.7 | 8.1 | 8.7 |
| After aging in soda solution | 5.2 | 6.2 | 6.0 | 6.9 |

EXAMPLE 6

Abrasion performance in abrasive cutting

From each of an untreated grain mixture of semifriable fused alumina (Abramant®) and one treated according to the invention according to Example 1, each consisting of 25 percent by weight of grain F24, 50 percent by weight of grain F30 and 25 percent by weight of grain F36, synthetic resin-bonded abrasive cutting wheels with the dimension 230×2.5×22 mm were produced as follows: 65 percent by weight of abrasive grain mixture, 20 percent by weight of phenolic resin mixture (liquid and solid) and 15 percent by weight of filler materials (cryolite, pyrite) were mixed into a homogeneous moist mass and were pressed with two external fabrics in a press mold at 270 bars into abrasive cutting wheels. The wheels were cured at 180° C. Some of the wheels were each kept in boiling water for 75 minutes. The abrasive performance was determined on flat rolled steel made of nickel chromium steel (18/8, WSt No. 4305) of the cross-section 50 mm ×20 mm with a commercially available abrasive cutting machine. For each wheel ten cuts were made and afterwards the decrease in the diameter of the wheel was determined. Table 4 shows the results of the tests:

TABLE 4

| Wear of the abrasive cutting wheel according to Example 6 | | |
|---|---|---|
| Grain | Untreated | According to the invention Example 1 |
| Decrease in the diameter of the wheel | | |
| Without storage (i.e., in water) | 8.33 ± 0.66 | 7.66 ± 0.57 |
| With storage (i.e., in water) | 12.66 ± 0.57 | 10.66 ± 0.57 |
| Mean increase in wear by storage (in water) (mm) | 4.33 | 3.00 |
| Relative increase in wear | 100% | 70% |

EXAMPLE 7

Abrasive performance in abrasive cutting

Out of a silicon carbide grain mixture of grain size 0.4 to 1.0 mm (Carbogran®), six abrasive cutting wheels were produced analogously to Example 6 and were stored in boiling water.

The composition was:
75 percent by weight of silicon carbide, 0.4 to 1.0 mm
15 percent by weight of phenolic resin mixture (liquid and solid)
10 percent by weight of filler materials (cryolite, pyrite)
The wheel pressure was 200 bars; the curing took place at 190° C. The abrasive performance was determined on vibration compressed concrete bars having a cross section of 80 mm×60 mm. For this purpose, five cuts per wheel were performed with a commercially available abrasive cutting machine and then the decrease in the diameter of the wheel was determined. The results are set out in Table 5:

TABLE 5

| Wear of the abrasive cutting wheel according to Example 7 | | |
|---|---|---|
| Grain | Untreated | According to the invention Example 1 |
| Decrease in the diameter of the wheel | | |
| Without storage (i.e., in water) | 9.6 ± 0.5 | 8.3 ± 0.5 |
| With storage (i.e., in water) | 13.2 ± 0.7 | 11.2 ± 0.7 |
| Mean increase in wear by storage | 3.6 | 2.9 |

TABLE 5-continued

| Wear of the abrasive cutting wheel according to Example 7 | | |
| --- | --- | --- |
| Grain | Untreated | According to the invention Example 1 |
| (in water) (mm) Relative increase in wear | 100% | 80% |

What is claimed is:

1. Abrasive grain based on corundum or silicon carbide, characterized by a superficially adhering coating of 0.001 to 5.0 percent, relative to the weight of the abrasive grain, of microdispersed hydrophobic silicon dioxide.

2. Abrasive grain according to claim 1 wherein the coating is 0.1 to 1.0 percent, relative to the weight of the abrasive grain, of the microdispersed hydrophobic silicon dioxide.

3. Abrasive grain according to claim 2 wherein the microdispersed hydrophobic silicon dioxide has a particle size of the primary particles of 5 to 100 nm in $d_{50}$ value and a specific surface of 80 to 300 m$^2$/g according to BET.

4. Abrasive grain according to claim 3 wherein the particle size of the primary particles is 7 to 20 nm in $d_{50}$ value and the specific surface is 100 to 150 m$^2$/g according to BET.

5. Abrasive grain according to claim 4 wherein the abrasive grain is additionally treated by heat drying with a compound having the following formula:

$$H_2N\text{-}(CH_2)_n\text{-}Si(OR)_3$$

wherein n is 2 to 4 and R is a $C_1$-$C_4$-alkyl.

6. Abrasive grain according to claim 1 wherein the microdispersed hydrophobic silicon dioxide has a particle size of the primary particles of 5 to 100 nm in $d_{50}$ value and a specific surface of 80 to 300 m$^2$/g according to BET.

7. Abrasive grain according to claim 6 wherein the particle size of the primary particles is 7 to 20 nm in $d_{50}$ value and the specific surface is 100 to 150 m$^2$/g according to BET.

8. Abrasive grain according to claim 1 wherein the abrasive grain additionally treated with a silane having the following general formula:

$$H_2N\text{-}(CH_2)_n\text{-}Si(OR)_3$$

wherein n is 2 to 4 and R is a $C_1$-$C_4$-alkyl.

9. Process for producing the abrasive grain of claim 1, comprising coating untreated abrasive grain based on corundum or silicon carbide by mixing or spraying the untreated abrasive grain with a suspension of the microdispersed silicon dioxide in a vaporizable liquid and subsequent drying of the material.

10. Process comprising using the abrasive grain of claim 1 in synthetic resin bonded abrasives.

* * * * *